(12) United States Patent
Trott (10) Patent No.: US 9,854,949 B2
(45) Date of Patent: *Jan. 2, 2018

(54) COMPOSTING TOILET

(71) Applicant: EOS Designs, LLC, Buxton, ME (US)

(72) Inventor: Geoffrey Trott, Buxton, ME (US)

(73) Assignee: EOS Design, LLC, Buxton, ME (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/012,462

(22) Filed: Feb. 1, 2016

(65) Prior Publication Data

US 2016/0235262 A1  Aug. 18, 2016

Related U.S. Application Data

(63) Continuation of application No. 13/303,118, filed on Nov. 22, 2011, now Pat. No. 9,247,852.

(60) Provisional application No. 61/416,273, filed on Nov. 22, 2010.

(51) Int. Cl.
*A47K 11/02* (2006.01)

(52) U.S. Cl.
CPC .................................. *A47K 11/02* (2013.01)

(58) Field of Classification Search
CPC ...................................................... A47K 11/02
See application file for complete search history.

(56) References Cited

U.S. PATENT DOCUMENTS

| | | | | |
|---|---|---|---|---|
| 420,332 A | * | 1/1890 | Carrico | A47K 11/02 4/463 |
| 3,251,068 A | * | 5/1966 | Milette | E03D 7/00 4/323 |
| 3,720,962 A | * | 3/1973 | Harrah | E03D 3/00 4/249 |
| 3,747,130 A | * | 7/1973 | Sargent | E03D 5/012 4/321 |
| 3,859,672 A | * | 1/1975 | Modig | A47K 11/02 4/111.1 |
| 3,883,903 A | * | 5/1975 | Vanden Broek | E03D 5/012 4/440 |
| 3,918,106 A | * | 11/1975 | Hellqvist | A47K 11/02 4/463 |
| 3,939,500 A | * | 2/1976 | Miller | E03D 11/10 4/332 |
| 3,939,501 A | * | 2/1976 | Sargent | A47K 11/02 4/317 |
| 3,959,829 A | * | 6/1976 | Nordgren | A47K 11/02 4/111.2 |

(Continued)

*Primary Examiner* — Janie Loeppke (74) *Attorney, Agent, or Firm* — Beusse, Wolter, Sanks & Maire; John L. DeAngelis (57) ABSTRACT

A toilet. The toilet comprises an upper bowl defining a first fecal aperture, a lower bowl defining a second fecal aperture, a urine receptacle and a feces receptacle. The upper bowl defines a urine aperture. A raised barrier extends upwardly around a periphery of the second fecal aperture. When a diverter panel is closed urine flows from the upper bowl through the urine aperture into the urine receptacle or urine flows through the first fecal aperture, strikes an upper surface of the diverter panel, and through an opening between a lower surface of the upper bowl and the upper surface of the diverter panel into the urine receptacle. In a third path when the diverter panel is opened urine flows through the urine aperture into the urine receptacle, the raised barrier prevents urine flow into the feces receptacle through the second fecal aperture.

20 Claims, 9 Drawing Sheets

(56) References Cited

U.S. PATENT DOCUMENTS

| | | | | |
|---|---|---|---|---|
| 3,968,526 A * | 7/1976 | Harrah | ............. | E03D 5/012 4/420 |
| 3,996,628 A * | 12/1976 | Mollerstedt | ............. | E03D 3/10 4/361 |
| 4,001,108 A * | 1/1977 | Hellqvist | ............. | A47K 11/02 210/150 |
| 4,087,869 A * | 5/1978 | Billsund | ............. | A47K 11/02 4/111.5 |
| 4,091,475 A * | 5/1978 | Hewson | ............. | E03D 7/00 251/177 |
| 4,155,129 A * | 5/1979 | Russell | ............. | E03D 3/02 4/424 |
| 4,240,164 A * | 12/1980 | Lind | ............. | A47K 11/02 366/196 |
| 4,439,875 A * | 4/1984 | Stewart | ............. | E03D 5/012 251/147 |
| 4,519,103 A * | 5/1985 | De Graw | ............. | E03D 5/016 204/240 |
| 4,564,446 A * | 1/1986 | De Graw | ............. | E03D 5/016 210/167.01 |
| 5,293,651 A * | 3/1994 | Johansson | ............. | A47K 13/24 4/420 |
| 5,303,431 A * | 4/1994 | Johansson | ............. | A47K 11/02 4/449 |
| 5,345,618 A * | 9/1994 | Sigler | ............. | E03F 1/006 4/321 |
| 5,903,932 A * | 5/1999 | Whitesel | ............. | A47K 11/00 4/476 |
| 6,212,700 B1 * | 4/2001 | Giesler | ............. | E03D 5/012 4/420 |
| 6,763,528 B2 * | 7/2004 | West | ............. | A47K 11/023 4/111.1 |
| 6,977,005 B2 * | 12/2005 | Erdmann | ............. | B64D 11/02 4/316 |
| 7,360,259 B2 * | 4/2008 | Chan | ............. | E03D 5/014 4/300.3 |
| 7,690,053 B2 * | 4/2010 | Pondelick | ............. | E03D 11/08 4/431 |
| 2002/0112281 A1 * | 8/2002 | Erdmann | ............. | B64D 11/02 4/321 |
| 2007/0130678 A1 * | 6/2007 | Ikeda | ............. | A47K 11/02 4/434 |
| 2007/0199140 A1 * | 8/2007 | Lee | ............. | A47K 11/02 4/449 |
| 2008/0307574 A1 * | 12/2008 | Villgren | ............. | A47K 11/02 4/449 |

* cited by examiner

COMPOSTING TOILET

CROSS REFERENCE TO RELATED APPLICATIONS

This patent application is a continuation application which claims the benefit of the patent application filed on Nov. 2, 2011, assigned application Ser. No. 13/303,118 and entitled Composting Toilet, now U.S. Pat. No. 9,247,852, issued on Feb. 2, 2016, which claims priority under Section 119 to the provisional application filed on Nov. 22, 2010, assigned application No. 61/416,273 and entitled Composting Toilet.

FIELD OF THE INVENTION

The present invention pertains to composting toilets that utilize natural breakdown process of human feces, and more particularly pertains to composting toilets that are portable and do not require significant energy utilization.

BACKGROUND OF THE INVENTION

With recent advancements in wireless telecommunications, an increasing number of people are able to work in more isolated locations such as boats, vehicles, remote sites and cabins where traditional plumbing systems and electric power supply may not be available. There is therefore a need for a toilet that provides a convenient, clean, and an environmentally safe process for containing and disposing of human waste for use by people in such remote locations. There is also a need for such a toilet that is portable to allow for easy transport of the toilet to the desired remote location.

Traditional portable toilets that have been used in remote locations utilize chemicals to mask the unpleasant smell of human waste. In such chemical toilets, both the feces and urine of the user drop down into a receptacle that contains sufficient chemicals, typically liquid, to cover the feces and urine. The chemicals prevent breakdown of the human waste and are scented to mask the odor of the waste. However, the chemicals used in such chemical toilets are often environmentally harmful. Also, chemical toilets are limited in their ability to contain more than a few days worth of human waste, since the receptacle containing the chemicals and the human waste may begin to overflow. And even if the receptacle is emptied, it requires that additional chemicals be on hand to replace the discarded chemicals, otherwise the toilet will not operate satisfactorily and the smell of additional human waste will not be masked.

Other toilets have been employed that attempt to utilize composting of feces rather than chemicals. It has long been known that feces may be composted, that is, the organic matter of human feces decays and becomes a relatively odorless substance that is environmentally friendly, and is in fact well suited for use as a fertilizer. It is also known, however, that the presence of excess urine significantly slows the rate of composting of feces.

Certain prior art composting toilets have a receptacle into which both feces and urine fall. These toilets require the user to drop peat moss into the composting chamber after each use in order to absorb excess urine, since otherwise the excess urine reduces the rate of composting of the feces. While such toilets utilizing peat moss have been found to be effective, they require that a supply of peat moss be maintained on hand, and the requirement of adding additional peat moss after each use makes the composting chamber fill up quickly, requiring an unacceptably frequent rate of emptying of the composting chamber. There is a need for a composting toilet that can operate effectively without requiring the continual addition of more peat moss.

Other prior art composting toilets have a receptacle into which both feces and urine fall, and these composting toilets overcome the problem of excess urine by utilizing heating elements to heat up the feces and urine. A fan circulates air in the composting chamber, to evaporate the excess urine in order to facilitate improved composting of the feces. However, such heating elements utilize considerable amounts of energy, and the combination of the heating elements and the fan requires too much energy for many applications. Thus there is a need for a composting toilet that does not require such significant amounts of energy.

Other prior art marine toilets are designed to handle raw sewage in its conventional liquid form, i.e., urine, fecal matter and flush water, and require vacuum pumping of the waste.

BRIEF DESCRIPTION OF THE DRAWINGS

In the drawings, wherein like elements are referenced alike.

DETAILED DESCRIPTION OF THE PREFERRED EMBODIMENTS

Before describing in detail the particular apparatuses and methods related to a compositing toilet in accordance with the various embodiments of the present invention, it should be observed that these embodiments reside primarily in a novel combination of hardware elements related to the claimed apparatuses and methods. Accordingly, the hardware elements have been represented by conventional elements in the drawings, showing only those specific details that are pertinent to the presented embodiments so as not to obscure the disclosure with details that will be readily apparent to those skilled in the art having the benefit of the description herein.

The following embodiments are not intended to define limits as to the structures or methods of the invention but only to provide exemplary constructions. The embodiments are permissive rather than mandatory and illustrative rather than exhaustive.

Generally, the present invention is different from the prior art toilets in that it can accommodate dry and moist fecal material mixed with desiccant/peat, which is then hydrated and evacuated from the toilet via a vacuum process.

In accordance with one embodiment of the present invention there is provided a toilet comprising a main receptacle for receiving feces and urine of a user. The main receptacle has one or more urine apertures in a lower portion thereof through which urine may flow out of the main receptacle, under the influence of gravity, into a urine receptacle. The main receptacle also has one or more fecal apertures in a lower portion thereof through which feces may leave the main receptacle under the influence of gravity. The fecal aperture(s) has a raised perimeter to prevent urine from draining into a fecal receptacle. The fecal receptacle has at least a portion thereof disposed beneath the fecal aperture for receiving and storing feces that fall downward through the fecal aperture. Said fecal receptacle has at least two apertures for allowing flushing and draining of its contents.

The urine receptacle has at least a portion thereof disposed at a height lower than the main receptacle for receiving and storing urine. Also, the toilet has at least one urine flow passageway for directing urine that flows out of the main receptacle into the urine receptacle under the influence of gravity. The urine flow passageway has raised edges for directing urine away from the fecal receptacle.

Figure 1:
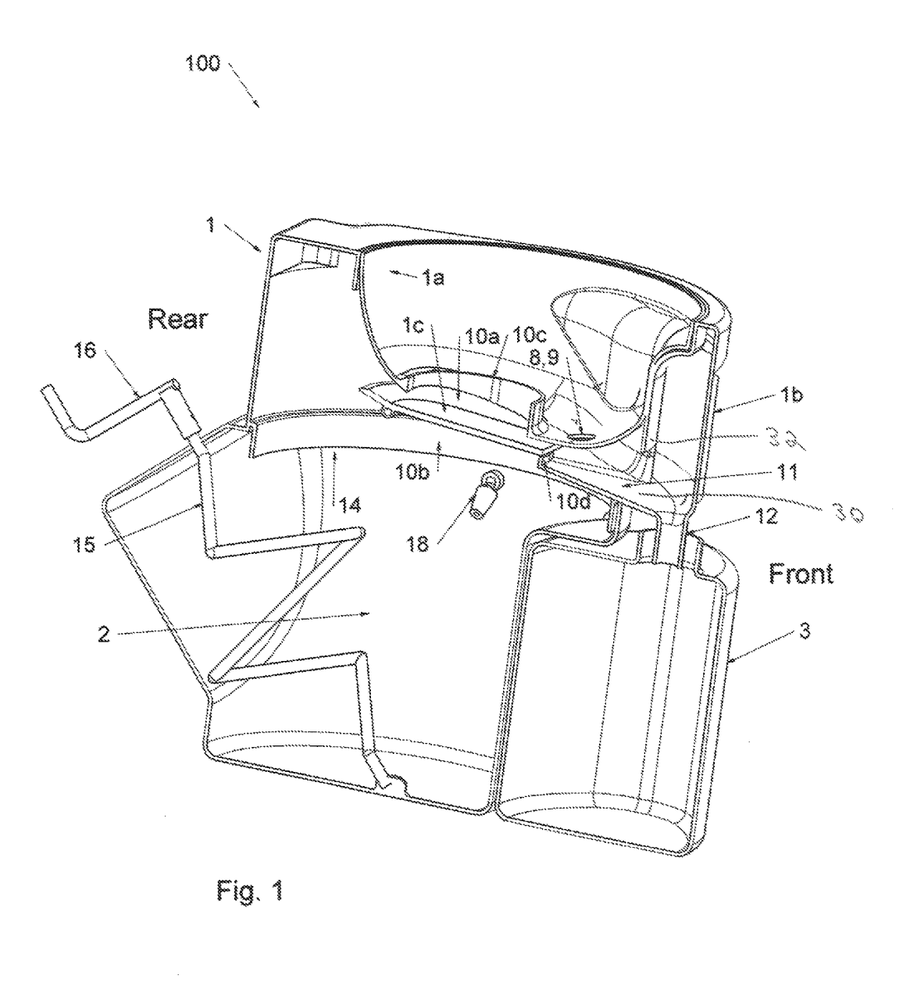
FIG. 1 is a sectional view of a preferred embodiment of composting toilet embodying various features of the present invention.

A composting toilet embodying various features of the present invention is illustrated in FIGS. 1-9 and referred to generally by reference number 100. The toilet 100 has a main receptacle 1 onto which a suitable toilet seat (not shown) may be mounted. While it is readily appreciated that the main receptacle 1 may be a single integral piece or another configuration, in the preferred and illustrated embodiment the main receptacle 1 comprises an upper bowl portion 1a and a lower bowl portion 1b. As best seen in FIG. 1, the upper bowl portion 1a is supported upon and nests inside of the lower bowl portion 1b. The upper bowl portion 1a has a fecal aperture 10a, and the lower bowl portion 1b has a fecal aperture 10b, with the two fecal apertures 10a and 10b being in registration with, or substantially aligned with, one another when the upper bowl portion 1a is nested inside of the lower bowl portion 1b. It is not required that the two fecal apertures 10a and 10b be the same size.

The nested upper and lower bowl portions 1a and 1b are supported on and disposed above a fecal receptacle 2. The fecal receptacle 2 has an opening 14 in its upper end that is also below the two fecal apertures 10a and 10b of the upper and lower bowl portions 1a and 1b when the main receptacle 1 is mounted on the fecal receptacle 2. As can be seen, the opening 14 is larger than the openings 10a and 10b. This alignment or registration of the respective apertures and openings allows feces from the user to fall through the two fecal apertures 10a and 10b and through the opening 14 into an interior of the fecal receptacle 2.

Figure 5:
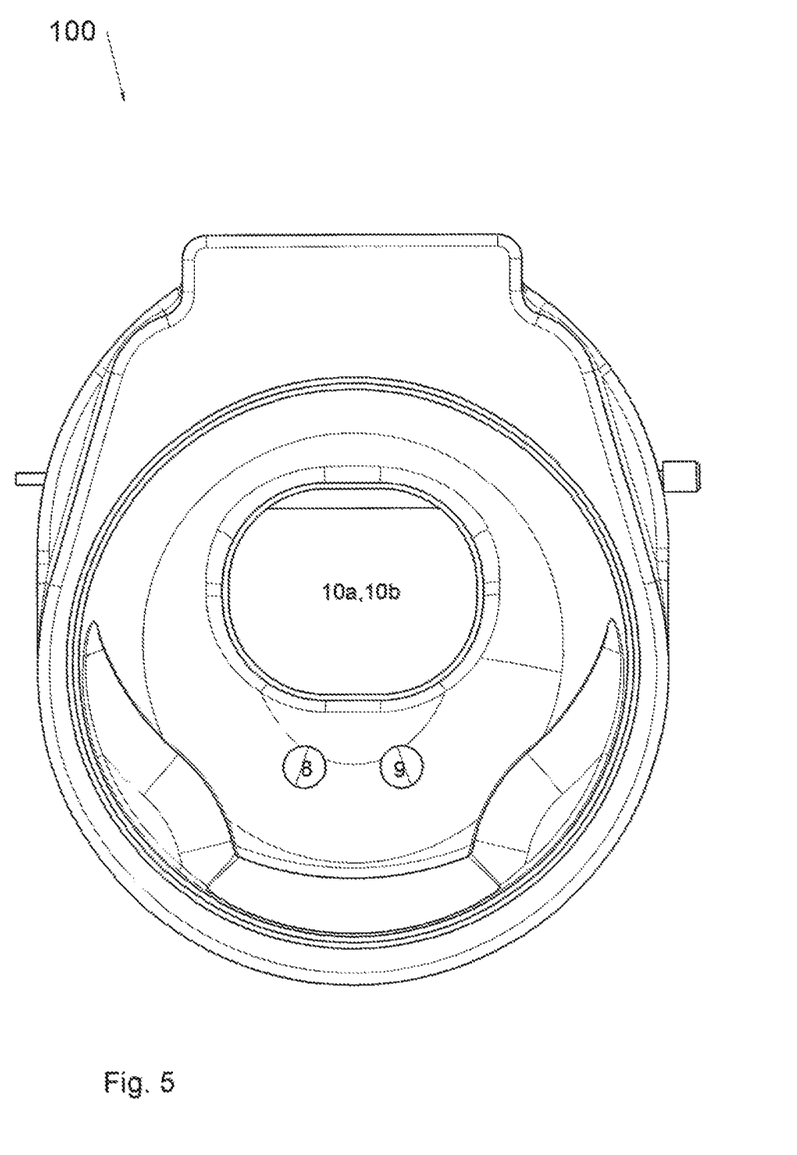
FIG. 5 is a top elevation view of the toilet of FIG. 1.

The upper bowl portion 1a of the main receptacle 1 has an inclined surface or surfaces for directing urine of the user, which is imparted into the main receptacle 1, toward a urine aperture 9 disposed at the front, lower end of the upper bowl portion 1a. (The reference numeral 8 in FIG. 1 refers to a second urine aperture that is aligned with the urine aperture 9, but is disposed in the section of the upper bowl receptacle 1a that has been removed and is not illustrated in FIG. 9. FIG. 5 illustrates both urine apertures 8 and 9. A raised barrier 10c encircles the perimeter of the fecal aperture 10a. This raised barrier 10c prevents the urine from draining into the fecal aperture 10a. In an alternative embodiment, the apertures 8 and 9 may be replaced by additional apertures.

The lower bowl portion 1b also has an inclined surface or surfaces 11 to direct the urine toward the lower bowl urine aperture 12 and has raised barrier 10d around the perimeter of aperture 10b for directing urine during periods of angled use. After striking the surface 11, the urine passes through a slot 30 in a surface 32.

The urine aperture 12 may be located at or near the front, lower end of the lower bowl portion 1b.

Accordingly, urine which is imparted into the upper bowl portion 1a of the main receptacle 1, and which does not pass into the feces aperture 10a of the upper bowl portion 1a, is diverted under the influence of gravity toward the urine apertures 8 and 9, and flows down through the urine apertures 8 and 9 under the influence of gravity. After passing down through the urine apertures 8 and 9, the urine falls onto an inclined surface 11 of the lower bowl portion 1b, which diverts the urine under the influence of gravity through the slot 30 and towards the lower bowl urine aperture 12. From there the urine flows down through the lower bowl urine aperture 12, and flows out of the main receptacle 1 under the influence of gravity.

A urine receptacle 3 is connected either directly or indirectly to the lower bowl urine aperture 12, whereby urine flowing out of the main receptacle 1 through the lower bowl urine aperture 12 flows into the urine receptacle 3 under the influence of gravity. The contents of the urine receptacle 3, which consists primarily of urine, are thus physically separate from the contents of the fecal receptacle 2, which consists primarily of feces.

This diversion of the urine under the influence of gravity to a separate receptacle from the fecal receptacle allows for a significantly improved rate of composting of the feces in the fecal receptacle without the need for heating elements to evaporate urine from the fecal receptacle or the need to repeatedly add peat moss into the fecal receptacle to absorb excess urine.

While the inclined surfaces of the upper and lower bowl portions 1a and 1b are both directed toward the front of the main receptacle 1 in the preferred and illustrated embodiment, it is appreciated that the surfaces of the upper and lower bowl portions 1a and 1b do not have to be directed in a common direction, and they may be directed to any direction and not necessarily the front direction. A wide variety of other suitable configurations of urine aperture locations and surface contours are also well suited for use with the present invention. For instance, the lower surface of the upper bowl portion 1a may be inclined to direct urine to the left side of the upper bowl portion 1a, and the urine aperture 9 may be located to the left side of the upper bowl portion 1a. The inclined surface 11 of the lower bowl portion 1b angled to direct the urine to any of the right side, front side, left side, rear side, or any location between the stated directions. The lower bowl urine aperture 12 may be located to whichever side the included surface 11 directs the urine, without regard to the direction which the upper bowl portion 1a directs the urine, or the location of the urine aperture 9 of the upper bowl portion 1a. Also, the apertures may be located on opposite sides of upper bowl portion 1a with the inclined surfaces directing the urine to either or both sides. As previously mentioned the main receptacle 1 may in another embodiment be comprised of a single integral piece without nested upper and lower bowl portions 1a and 1b whereby all urine not directed into fecal aperture 10a flows toward the urine aperture 9. This configuration provides for a shorter overall height of toilet 100 for use in low ceiling applications.

Figure 3:
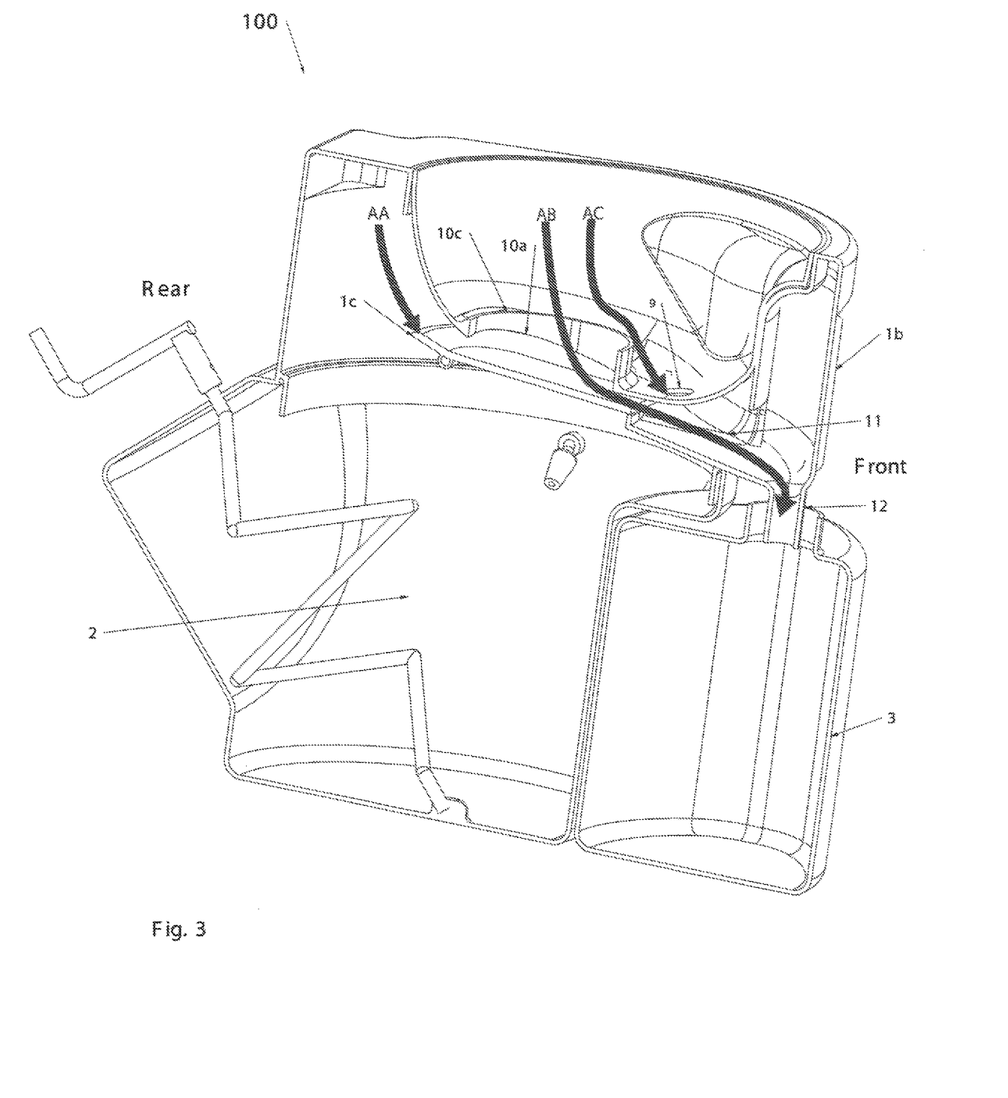
FIG. 3 is a sectional view of the composting toilet of FIG. 1 showing the deflector in its closed position.
Figure 4:
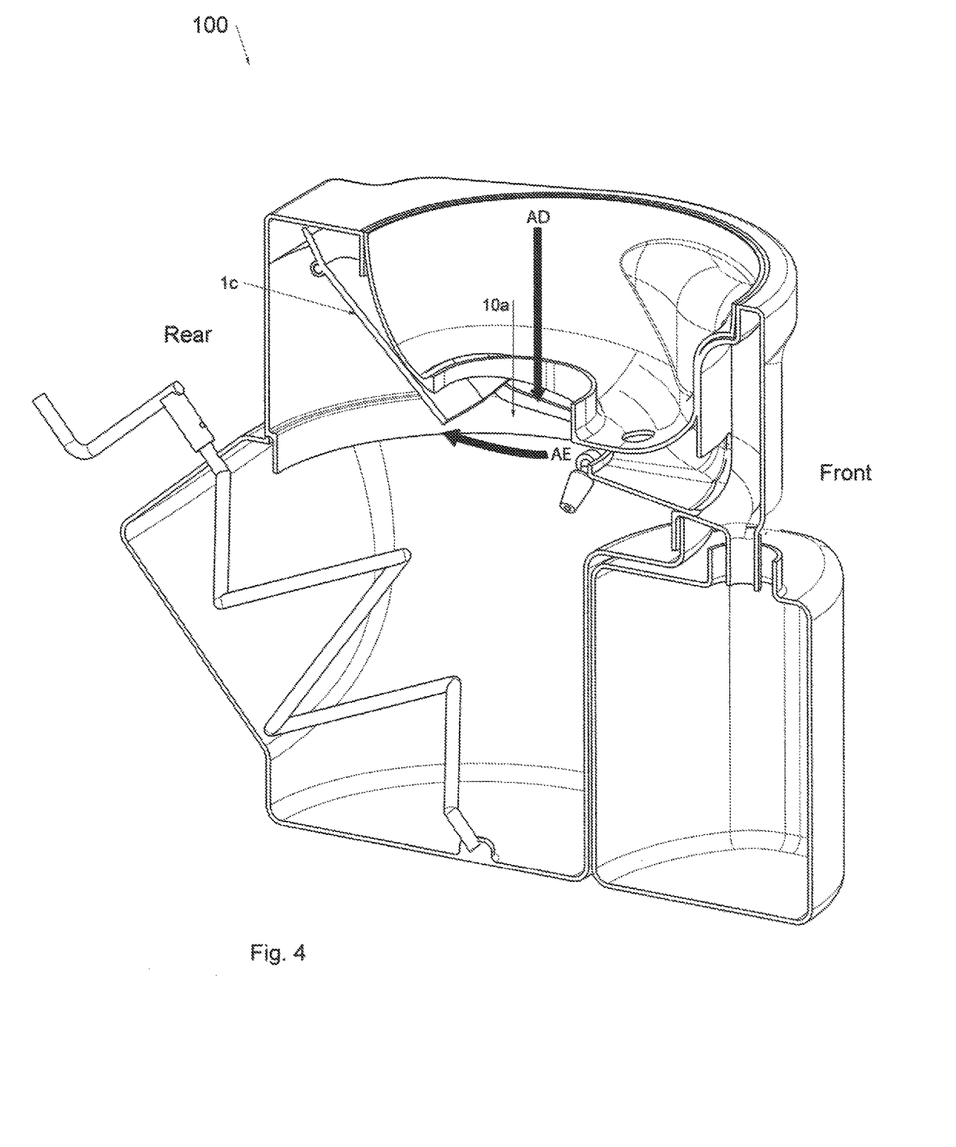
FIG. 4 is a sectional view of the composting toilet of FIG. 3 showing the deflector in its open position.

Although the present invention will function without it, the preferred embodiment also has a diverter panel 1c that is moveable between a closed position (as illustrated in FIGS. 1 and 3) in which the diverter panel 1c extends over and covers the fecal aperture 10a to substantially block urine and feces from passing through the fecal aperture, and an open position (as illustrated in FIG. 4) in which the diverter panel 1c is moved away from the fecal aperture 10a so that the diverter panel 1c does not block urine or feces from passing through the feces aperture 10a. In its closed position the upper face of the diverter panel 1c is inclined upwardly in a direction toward the rear of the lower bowl portion 1b. See FIG. 4.

Figure 6:
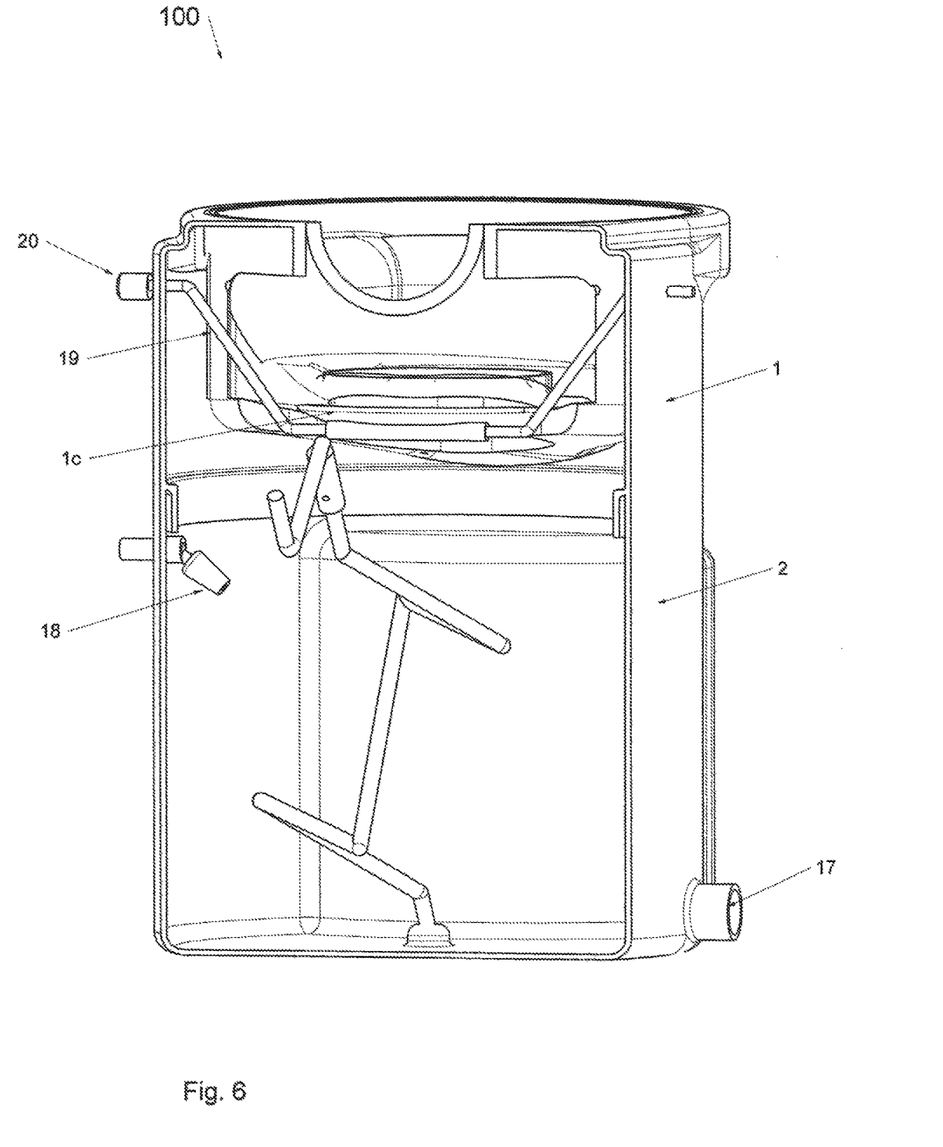
FIG. 6 is a rear sectional view of the toilet of FIG. 1.
Figure 7:
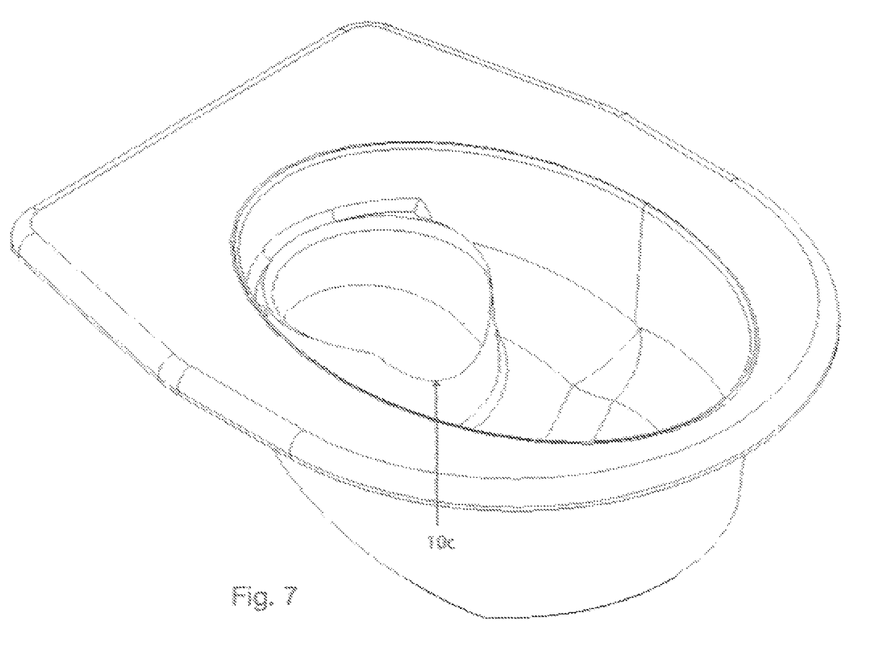
FIG. 7 is an alternative placement of a fecal aperture showing a variation of the raised lip of other embodiments.

In the illustrated embodiment of FIG. 6, the diverter panel 1c is mounted on a rod 19 that is actuated by turning a lever 20 mounted on the side surface of upper bowl portion 1a. The diverter panel 1c can be swung back and up by turning lever 20 preventing diverter panel 1c from blocking apertures 10a and 10b.

During uses in which the user only urinates, the diverter panel 1c is moved in the direction indicated by an arrowhead AA in FIG. 3 to its closed position prior to use, preventing the urine from passing through the feces aperture 10a. Following the path of an arrowhead AB, urine imparted toward the feces aperture 10a impinges on the diverter panel 1c, which covers the feces aperture 10a and flows off the diverter panel 1c, onto the inclined surface 11 through aperture 12.

Alternatively, the urine may follow a path indicated by an arrowhead AC. Any urine imparted around the circumference of fecal aperture 10a impinges on upper bowl portion 1a and flows around raised barrier 10c through aperture 9. Hence, with the diverter panel 1c in its closed position substantially all of the urine is directed into the urine receptacle 3, and little or no urine flows through the fecal aperture 10a, regardless of the direction or location of urination within the upper bowl portion 1a of the main receptacle 1. These features facilitate easy use by both males and females.

In mobile installations where toilet 100 may not be level, the raised barrier 10c prevents urine from entering the fecal aperture 10a and dripping off the sides of diverter panel 1c into feces receptacle 2. An alternative design of the raised barrier 10c is illustrated (see FIG. 7) where the raised barrier 10c merges with the wall of the upper bowl portion 1a.

During uses in which the user defecates, the diverter plate 1c is moved to its open position (see FIG. 4) during defecation to allow the feces of the user to fall straight through the upper bowl feces aperture 10a and the lower bowl portion feces aperture 10b, through the opening 14 of the feces receptacle 2, and into the feces receptacle 2 for storage and composting of the feces within the fecal receptacle 2. See FIG. 4 where arrowhead AD indicates the direction of the feces and arrow AE indicates the direction of movement of the diverter plate 1c to the open position.

Alternatively, for defecation, the diverter panel 1c may be moved to its closed position, and a piece of suitable biodegradable paper or the like, such as filter paper, may be placed over the feces aperture 10a. With the biodegradable paper restricted from falling through the feces aperture 10a by the diverter panel 1c, the feces of the user drops down onto the biodegradable paper. Subsequent movement of the diverter panel 1c to its open position allows the feces and biodegradable paper to drop down together through the upper bowl feces aperture 10a and lower bowl portion feces aperture 10b, through the opening 14 of the feces receptacle 2 and into the feces receptacle 2.

During those intervals of use in which the user is urinating rather than defecating, the diverter panel 1c is moved back to its closed position, to prevent substantially all urine imparted during urination from passing into the feces receptacle 2. Accordingly, by moving the diverter panel 1c between it open and closed positions at the appropriate time, substantially all urine will be directed or diverted into the urine receptacle 3, to keep the feces receptacle 2 substantially free of urine. In this regard, in one alternative embodiment, the diverter panel may be biased to its closed position, such as by a spring or the like, so that it may be held in its open position during defecation and may simply be released during all other times.

Figure 2:
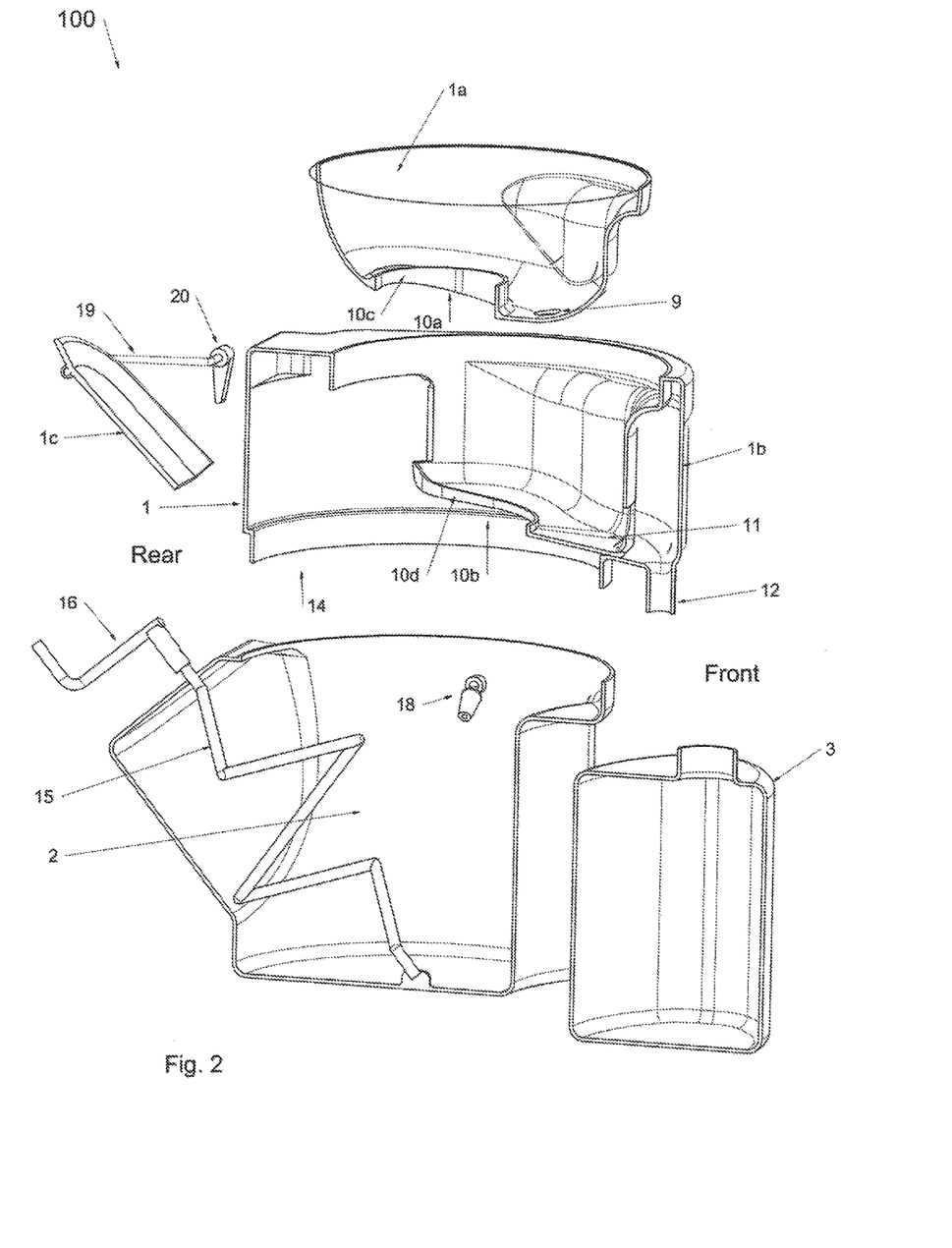
FIG. 2 is an exploded view of a composting toilet embodying various features of the present invention.

Any of several different agitator configurations are well suited for agitating the fecal contents of the feces receptacle 2, such as the agitator 15 shown in FIG. 2, which comprises a rod having a helical shape with an axis extending generally diagonally from a vertical axis. The agitator 15 is disposed for rotation within the feces receptacle 2, with the opposite ends of the central axle of the agitator 15 rotatably engaged with the feces receptacle 2, and one end of the agitator 15 being engaged with a handle 16 to allow manual rotation of the agitator 15.

While it is not necessary, it has been found that adding a small amount of peat moss or the like to the bottom of the feces receptacle 2 prior to the first use of the toilet and prior to the first subsequent use after the feces receptacle has been emptied, provides good results. The agitator 15 should be long enough to reach the peat moss, but it is not necessary that it extend down to the bottom surface of the feces receptacle 2. In fact, in some embodiments, it is preferred that a space be provided between the lowermost extension of the agitator and the bottom surface of the feces receptacle 2 so that composted material adjacent the bottom of the feces aperture is not re-mixed with fresh feces; the agitator only agitating the fresh feces.

For removing the contents of the feces receptacle 2, an aperture 17 (See FIG. 6) is designed to connect to a hose or suction device. For this embodiment the aperture 17 is preferably located near the bottom surface of the feces receptacle 2 but alternative locations such as the bottom or the top with a hose reaching to the bottom of feces receptacle 2 are also acceptable. The aperture 17 allows for removing the contents of the feces receptacle 2 by vacuum or another suitable device such as a pump. Generally the contents of the tank are in a non-free flowing state, which would normally prevent vacuum removal.

For this purpose a second aperture 18 (see FIG. 6) is provided to allow hydration of the contents using (for instance) a standard garden hose. The preferred embodiment utilizes a spherical bearing for the purpose of directing the stream of water however it would also be suitable to fill tank via other methods.

Figure 8:
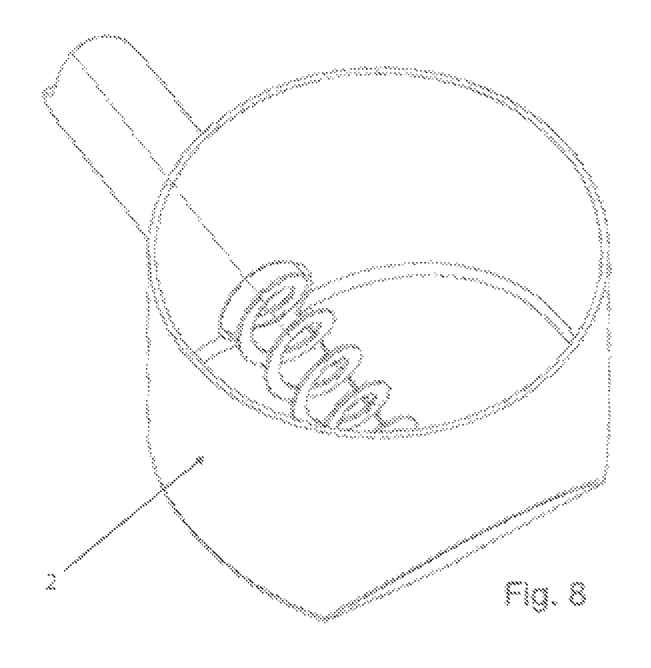
FIG. 8 illustrates an alternative transfer device.

In another embodiment the fecal material may be transferred from fecal receptacle 2 to a remote receptacle via any suitable means of transfer whether it be by conveyor, air pressure, suction, or water. FIG. 8 illustrates an auger conveyor.

Figure 9:
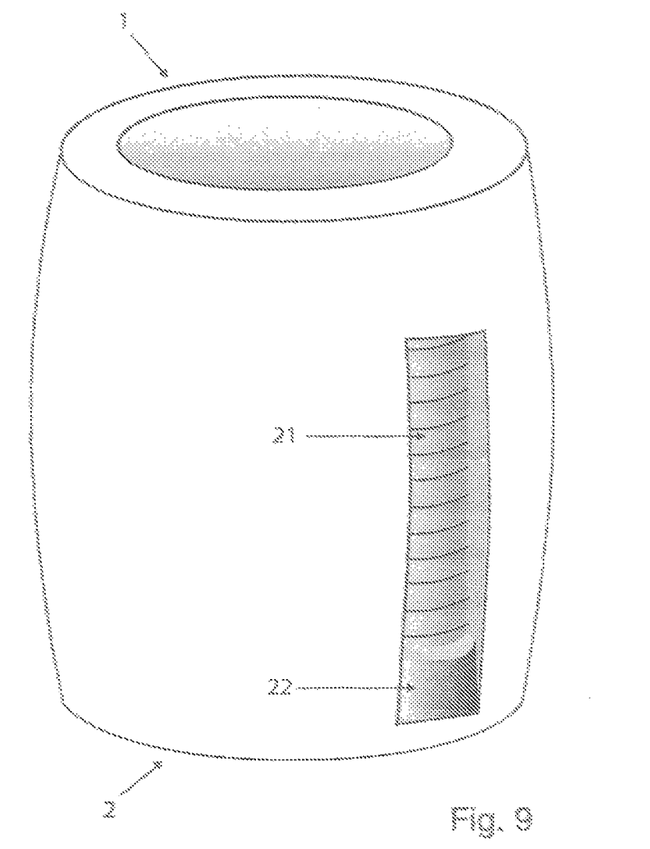
FIG. 9 illustrates an alternative portable version of one embodiment of the present invention.

It may be necessary for the decomposition process to have sufficient airflow throughout fecal receptacle 2 to allow aerobic bacteria to thrive. Although it is not necessary to have a fan creating this airflow, the use of said fan will optimize the decomposition and reduce the odors in the living space. FIG. 9 illustrates one embodiment which could be used transient situations such as camping. To maximize portability, a fan hose 21 is housed inside a slot molded into the fecal receptacle 2 during times of travel and non use. During times of toilet use, the hose 21 is removed from said slot and extended outside the living space. A fan housing 22 is mounted at the end of the hose run maximizing negative airflow.

While the invention has been described with reference to various embodiments, it will be understood by those skilled in the art that various changes may be made and equivalent elements and process steps may be substituted for elements thereof without departing from the scope of the present invention. The scope of the present invention further includes any combination of the elements and process steps from the various embodiments set forth herein. In addition, modifications may be made to adapt a particular situation to the teachings of the present invention without departing from its essential scope. Therefore, it is intended that the invention not be limited to the particular embodiment disclosed as the best mode contemplated for carrying out this invention, but that the invention will include all embodiments falling within the scope of the appended claims.

What is claimed is:

1. A toilet, comprising:
   an upper bowl portion for receiving feces and urine of a user and defining a first fecal aperture therein;
   a lower bowl portion below the upper bowl portion and defining a second fecal aperture therein, the second fecal aperture below the first fecal aperture;
   a urine receptacle;
   a feces receptacle below the first and second fecal apertures for receiving feces of the user;
   the upper bowl portion defining a urine aperture through which urine flows under influence of gravity from the upper bowl portion into the urine receptacle;
   a raised barrier extending upwardly around a periphery of the second fecal aperture;
   a diverter panel moveable between a closed and an opened position for closing the second fecal aperture;
   a first and a second path for urine to flow from the upper bowl portion into the urine receptacle when the diverter panel is in the closed position, along the first path urine flows from the upper bowl portion through the urine aperture into the urine receptacle, and along the second path urine flows through the first fecal aperture, strikes an upper surface of the diverter panel, and flows through an opening between a lower surface of the upper bowl portion and the upper surface of the diverter panel and into the urine receptacle without passing through the urine aperture; and
   a third path for urine to flow into the urine receptacle when the diverter panel is in the opened position, along the third path urine flows from the upper bowl through the urine aperture into the urine receptacle, the raised barrier for preventing urine flow into the feces receptacle through the second fecal aperture.

2. The toilet of claim 1 the raised barrier having a minimum height of ¼ inch.

3. The toilet of claim 1 where the raised barrier varies in height wherein the height increases in a direction toward the urine receptacle.

4. The toilet of claim 1 the feces receptacle comprising an agitator for use in mixing the feces with a material added to the feces receptacle, the action of mixing providing increased aeration of contents of the feces receptacle to facilitate composting of the contents.

5. The toilet of claim 4 the agitator disposed in an approximately diagonal orientation, the agitator comprising a first end located anywhere above approximately an uppermost third of the main receptacle and an opposite second end located below approximately a lowermost third of the main receptacle, the feces receptacle defining an opening to secure the upper end of the agitator and through which a portion of the agitator proximate the first end passes.

6. The toilet of claim 5 the feces receptacle comprising a receiving region within an interior surface thereof to secure the second end of the agitator.

7. The toilet of claim 1 the feces receptacle comprising an outlet for use in transferring feces to a secondary feces receptacle or to a remote site.

8. The toilet of claim 1 having one or more apertures for supplying water or a diluent into the feces receptacle and for evacuating feces receptacle contents.

9. The toilet of claim 8 the one or more apertures comprising a component for providing a high-pressure spray of the water or the diluent.

10. The toilet of claim 9 the one or more apertures further comprising a rotatable component for permitting rotation of the component for providing a high-pressure spray.

11. The toilet of claim 8 the one or more apertures comprising a male barbed fitting for interfacing with a mating fitting attached to a hose.

12. The toilet of claim 8 the one or more apertures configured to receive a marine discharge hose having an inner diameter between ⅝ inch and 1.5 inches.

13. The toilet of claim 1 wherein configuration of the urine aperture and the fecal aperture effects separation of the urine and feces into their respective urine aperture and fecal aperture.

14. The toilet of claim 1 further comprising a fan for circulating air through the fecal receptacle to facilitate evaporation of moisture in the fecal receptacle.

15. The toilet of claim 14 defining an air flow path through which the fan circulates air, the air flow path passing through the fecal receptacle and the urine receptacle.

16. The toilet of claim 1 the fecal receptacle and the urine receptacle each independently detachable from the main receptacle.

17. The toilet of claim 1 the main receptacle comprising an upper bowl portion and a lower bowl portion.

18. The toilet of claim 1 wherein at least a segment of the first and second paths comprise inclined surfaces for directing urine toward the urine aperture.

19. The toilet of claim 1 wherein the first and second fecal apertures are aligned.

20. A toilet, comprising:
   an upper bowl portion for receiving feces and urine of a user and defining a first fecal aperture therein;
   a lower bowl portion below the upper bowl portion and defining a second fecal aperture therein, the second fecal aperture below the first fecal aperture;
   a urine receptacle;
   a feces receptacle below the first and second fecal apertures for receiving feces of the user;
   the upper bowl portion defining a urine aperture through which urine flows under influence of gravity from the upper bowl portion into the urine receptacle;
   a first raised barrier extending upwardly from a surface of the upper bowl portion around a periphery of the first fecal aperture;
   a second raised barrier extending upwardly from a surface of the lower bowl portion around a periphery of the second fecal aperture;
   a diverter panel moveable between a closed and an opened position for closing and opening the second fecal aperture;
   a first and a second path for urine to flow from the upper bowl portion into the urine receptacle when the diverter panel is in the closed position, along the first path urine flows from the upper bowl portion through the urine aperture into the urine receptacle, and along the second path urine flows through the first fecal aperture, strikes an upper surface of the diverter panel, and flows through an opening between a lower surface of the upper bowl portion and the upper surface of the diverter panel and flows into the urine receptacle without passing through the urine aperture; and a third path for urine to flow into the urine receptacle when the diverter panel is in the opened position, along the third path urine flows from the upper bowl through the urine aperture into the urine receptacle, the first and second raised barriers for preventing urine flow into the feces receptacle through the respective first and second fecal apertures.

* * * * *